Figure 1:
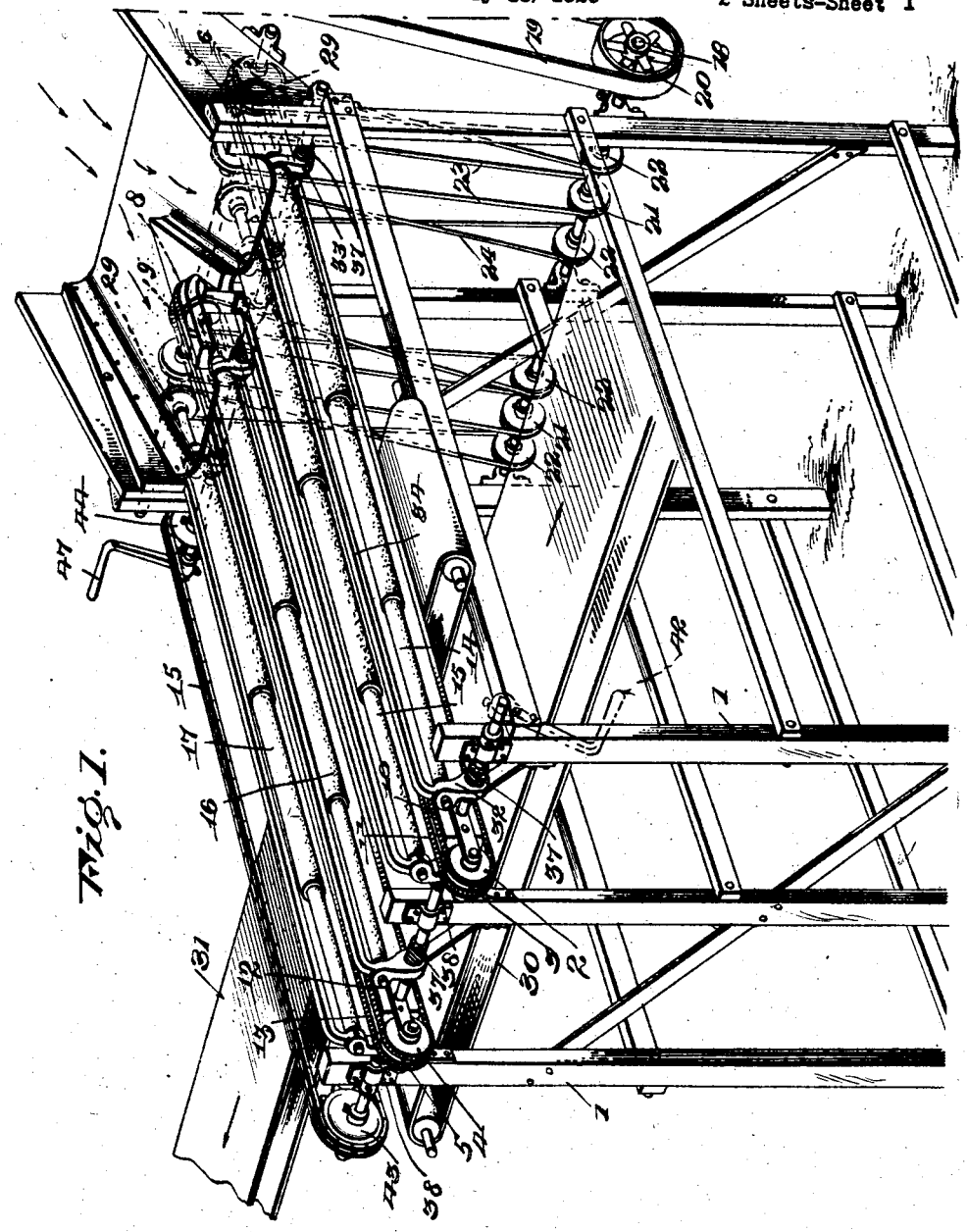

Sept. 20, 1927.

J. B. VON CANON

FRUIT SIZER

Filed July 13, 1926    2 Sheets-Sheet 1

1,643,190

WITNESSES

INVENTOR
J. B. Von Canon.
BY
ATTORNEYS

Sept. 20, 1927.　　　J. B. VON CANON　　　1,643,190
FRUIT SIZER
Filed July 13, 1926　　　2 Sheets-Sheet 2
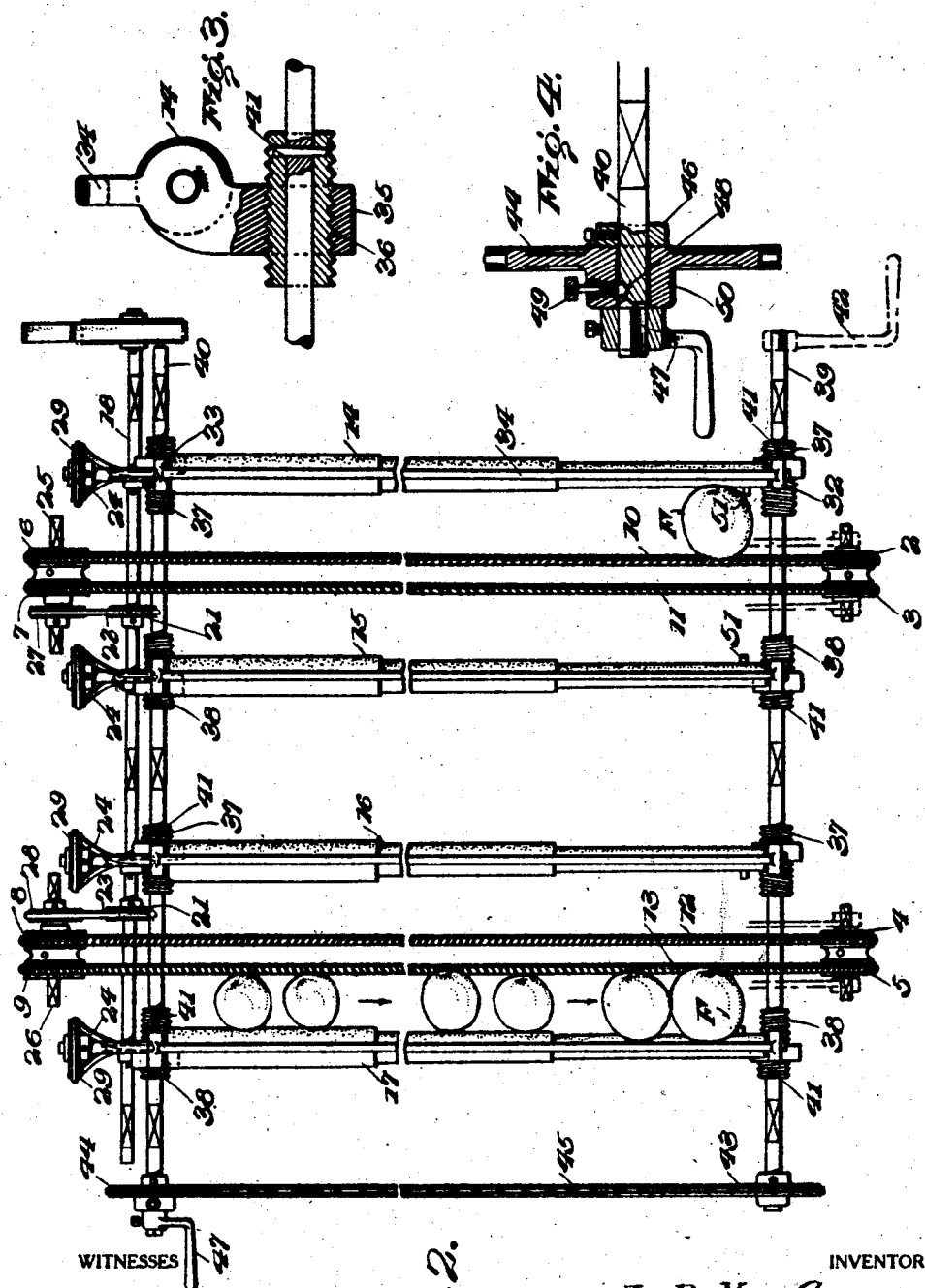

Patented Sept. 20, 1927.

1,643,190

UNITED STATES PATENT OFFICE.

JAMES B. VON CANON, OF WEST END, NORTH CAROLINA.

FRUIT SIZER.

Application filed July 13, 1926. Serial No. 122,228.

This invention relates to improvements in fruit sizers by means of which the sizing rollers may be adjusted to simultaneously move bodily in the respective directions or by means of which one or the other of the two ends of the rollers may be simultaneously adjusted alone in the manner more fully disclosed below.

Other objects and advantages appear in the following specification, reference being had to the accompanying drawings, in which Figure 1 is a perspective view of enough of a fruit sizer to illustrate the application of the invention, Figure 2 is a plan view of the fruit sizer in use, being confined to the parts immediately concerned, Figure 3 is a detail sectional view of one of the adjustable bearings, Figure 4 is a detail sectional view showing the means which permits individual adjustment of one or the other of the two ends of the sizer rollers.

The existing machine in which the improvement is effected is known as the Burke sizer, and is used for the purpose of assorting or grading peaches, pears and other tender fruit according to size, it being an important requirement in a machine of this character to handle the fruit without bruising the skin. The main details are described with particularity to enable the reader to understand the significance of the improvement.

Mounted upon the framework 1 are pairs of pulleys 2, 3; 4, 5; 6, 7 and 8, 9 (Fig. 2) which are separated into sets as shown, the two sets being respectively situated at what is herein known as the front and rear of the sizer. Spring belts 10, 11, 12 and 13 are applied to the various pulleys in parallel relationship, for example, the belt 10 is applied to the pulleys 2 and 6, etc., the spring belts being regarded as relatively fixed when considered in connection with the adjustable sizer rollers.

Of the latter four are shown, being designated 14, 15, 16 and 17. The number of sizer rollers varies with the capacity of the machine. The machine illustrated is known as the four-roll sizer, others being made with more or less rollers in even numbers.

The sizer rollers are disposed in parallel relationship to the adjacent spring belts, for example, the roller 14 is parallel with the spring belt 10. The two elements mentioned provide contacting surfaces (troughs, in effect) upon which the peaches or other fruits to be graded roll, said elements being in practice disposed on a slight downward slant toward the front of the machine to further the latter purpose. Each of the sizer rollers is formed in a plurality of diameters, and inasmuch as these becomes progressively smaller toward the front of the machine, it follows that the spaces through which the fruit may drop become progressively larger toward the front of the machine.

A countershaft 18 mounted upon the framework 1 (Fig. 1) and driven by any suitable source of power, for example the belt 19 and pulley 20, carries a plurality of pulleys 21 and 22 for the respective purposes of driving the spring belts 10, 11, etc. at the sizer rollers 14, 15, etc. for which purposes straight belts 23 are employed in the first instance and crossed belts 24 in the second instance. The pulleys 6, 7 and 8, 9 are mounted upon stub shafts 25, 26 (Fig. 2) which carry pulleys 27 and 28 to which the foregoing straight belts are applied. The various sizer rollers each have a pulley 29 to which the foregoing crossed belts 24 are applied.

The reader will understand that the rotation of the countershaft 18 will produce a simultaneous drive of all of the rollers and spring belts. The belts 10 are driven forwardly and the sizer rollers 14, etc. are driven outwardly in respect to the adjacent belts. The points of contact of the fruit are therefore continually changing thereby avoiding any possibility of injuring the fruit by friction. As the fruit is worked forwardly the various sizes drop through when appropriate places are reached, there being belts underneath, for example 30 and 31 (Fig. 1) to catch the fruit and convey it elsewhere. The largest fruit rolls off of the rollers at the front of the machine onto a suitable platform (not shown).

The improvement relates to the bearings of the sizer rollers 14, 15, etc. and to the adjustment thereof. By way of momentary deviation it may be stated that the procedure in vogue is to adjust the bearing at each end of each of the rollers individually when the need for adjustment arises.

When making such adjustments the operator must depend largely upon his eye for accuracy. It is evident that the axes of the sizer rollers should be maintained in parallelism with the associated spring belts 10, etc., but by virtue of the fact that the bearings, especially the rear bearings, are difficult to get at and the additional fact that the operator often is in a hurry there is always an ample margin of doubt whether the sizer rollers are in true position in respect to the spring belts.

Reverting to the improvement, it is proposed to make possible the simultaneous adjustment of all of the sizer roller bearings from one point, the making of the adjustment being possible while the machine is in operation.

Each of the sizer rollers has bearings 32 and 33 at the front and rear ends of the machine respectively. These may or may not be but preferably are connected by braces 34 which insure a certain desirable rigid spacing and support between and for the bearings. The rollers are mounted in these bearings, the roller shaft extending beyond the rear bearings 33, the necessary distance to carry the pulleys 29 mentioned. Each of the bearings has a boss 35 (Fig. 3) which is internally threaded as at 36.

Externally threaded bushings work in the internal threads of the bosses 35. The various threads are of right and left hand arrangement, the bushings which are threaded left hand being indicated 37, those threaded right hand being designated 38. The bushings may in practice consist of nothing more than sections of externally threaded gas pipes. These are mounted upon front and rear rods 39 and 40 to which they are secured as by means of a pin 41 shown in Fig. 3. The arrangement is such that the bushings of the sizer rollers 14, etc. are alternately left and right hand threads, the purpose being to simultaneously adjust the rollers either toward or away from the adjacent spring belts when one of the rods is turned.

A handle 42 on one end of the front rod 39 provides for the foregoing turning. The opposite end of the front rod carries a sprocket 43 which is connected with a similar sprocket 44 on the rear rod 40 by means of a chain 45. Turning of the rod 39 thus causes turning of the rod 40 and a simultaneous adjustment of all of the bearings 32 and 33.

Provision is also made for confining the adjustment of bearings either to the front or rear of the machine, and for this purpose the rear sprocket 44 has a loose mounting upon the rod 40 (Fig. 4), being held in place by a fixed collar 46 at one side and a second handle 47 on the other. The rod 40 has a recess 48 into which the end of a latch 49 is moved by spring pressure when in registering position. The latch is carried by the hub 50 of the sprocket 44.

Ordinarily the latch 49 will be in extended position in the recess 48, locking the rear rod 40 to the sprocket 44 so that a turning of the front rod 39 by means of the handle 42 will produce a turning of the rear rod 40 and the simultaneous adjustment of the bearings as stated. But should it be desired to turn the rear rod 40 independently, the latch 49 must be lifted out of the recess 48 whereupon the turning of the rod 40 by means of the handle 47 will cause an adjustment of the bearings 33 without affecting the bearings 32. On the same principle the lifting of the latch 49 will permit adjustment of the front bearings 32 without affecting the rear bearings 33.

The operation is readily understood. The fruit to be graded is introduced by way of a chute at the rear end of the machine (Fig. 1), the chute being so arranged that the fruit will roll down upon the associated pairs of sizer rollers 14 and spring belts 10, etc. The spring belts, although moving continuously in the forward direction, are regarded as relative fixtures but it is in respect to these that the sizer rollers are to be adjusted.

The sizer rollers have a plurality of diameters, providing increasingly larger spaces toward the front of the machine. The various diameters are alike when considered crosswise of the machine, and necessarily so because there is a belt for each step in the rollers, excepting the first part of the rollers which makes the smallest space. The inferior fruits drop through the smallest spaces, being directed by a suitable guide into bushel baskets or other receptacles. The necessity for accurate adjustment of each of the sizer rollers in respect to the adjacent spring belts becomes apparent when it is borne in mind that each of the diameters, so to speak, supplies the same belt or object conveyor.

The present practice necessitates the stopping of the sizer machine because the bearing at each end of each of the rollers must be adjusted independently. According to the improvement all of the bearings may be adjusted simultaneously, and this can be done without stopping the sizer. Referring to Figure 2, the sizer roller 14 has bearings 32 and 33 at the front and rear ends, carried by left hand threaded bushings 37. On the same principle the next roller 15 has bearings carried by right hand threaded bushings 38. A turn of the front rod 39 in one direction by means of the handle 42 will cause the rollers 14 and 15 to move away from the spring belts 10 and 11, while a turn in the opposite direction will cause them to move toward the spring belts. The same operation occurs in respect to the other sets of rollers and belts.

It is possible to make very fine adjustments of the rollers in respect to the spring belts, there being no danger of adjusting one end more than the other and thus moving the rollers out of parallelism with the belts. But should the occasion demand either an independent adjustment of either the front or rear rods the operator has but to lift the latch 49 (Fig. 4) whereupon either rod can be turned to adjust the bearings thereof without affecting the other rod and its bearings.

A further improvement resides in the proviison of one or more studs 51 at the discharge or front end of the rollers 14, 15, etc., the purpose of these being to dislodge a fruit F (Fig. 2) should there be any tendency to remain in position rather than to roll off into the platform (not shown) at the front.

While the construction and the arrangement of the improved fruit sizer is that of a generally preferred form, obviously modifications and changes may be made without departing from the spirit of the invention or the scope of the claims.

I claim:—

1. A device of the character described comprising a continuously driven spring belt, a continuously driven roller situated beside the belt, bearings upon which the roller is journaled at the ends; in combination, a boss formed upon each of the bearings, each boss having an internally threaded bore, a threaded bushing situated in each of the threaded bores, and means for simultaneously turning both bushings to shift the bearings in one direction and bodily shifting the entire roller in respect to the belt to vary the spacing between the belt and roller.

2. A device of the character described comprising a plurality of spring belts, a plurality of sizer rollers each being situated beside a belt in parallelism therewith, a common countershaft having elements for driving the respective belts and sizer rollers, a bearing for each end of each of the rollers, and means for simultaneously shifting all of the bearings thereby bodily moving the entire rollers in respect to the belts retaining said parallelism thereby to vary the spacing between the belts and rollers.

3. A device of the character described comprising a plurality of spring belts, a plurality of sizer rollers each being situated beside a spring belt in parallelism therewith, a bearing for each end of each of the rollers, each bearing having a pendant bushing with internally threaded bores, parallel rods extending across the device, threaded bushings carried by the rods and occupying said bores, drive means connecting the rods, and means for revolving one of the rods thereby revolving the other of the rods through said drive means causing simultaneous turning of all of the bushings and simultaneous shifting of all of the bearings to bodily adjust the rollers in respect to the belts and vary the spacing therebetween.

4. A device of the character described comprising a plurality of spring belts, a plurality of sizer rollers each being situated beside a spring belt in parallelism therewith, a bearing for each end of each of the rollers, said bearing of each roller having similarly threaded bores but the bore of the bearings of succeeding rollers being oppositely threaded thereby producing a succession of right and left hand threaded arrangements across the device, a pair of parallel rods extending across the device, a plurality of bushings carried by the rods one for each bearing and being appropriately threaded to work in the threaded bores of the bearings, and means to simultaneously turn both rods in the same direction thereby causing a simultaneous adjustment of all of the rollers in relation to the adjacent belts without disturbing the parallelism thereof.

5. A device of the character described comprising a plurality of spring belts, a plurality of sizer rollers each being situated beside a spring belt in parallelism therewith, a bearing for each end of each of the rollers, said bearing of each roller having similarly threaded bores but the bore of the bearings of succeeding rollers being oppositely threaded thereby producing a succession of right and left hand threaded arrangements across the device, a pair of parallel rods extending across the device, a plurality of bushings carried by the rods one for each bearing and being appropriately threaded to work in the threaded bores of the bearings, means to simultaneously turn both rods in the same direction thereby causing a simultaneous adjustment of all of the rollers in relation to the adjacent belts without disturbing the parallelism thereof, and means associated with the driving means of said rod being operable to confine the turning to one of the rods thereby confining the simultaneous adjustment to the series of bearings associated with said one rod and further confining the adjustment to one end of all of the rollers.

6. A device of the character described comprising a plurality of spring belts, a plurality of sizer rollers there being one for each of the belts situated in parallelism therewith, a bearing for each end of each of the rollers arranged in transverse series, a pair of transverse rods, screw adjustments between the rods and each of the bearings, the threads for each roller being the same but certain of threads being alternately right and left hand threads when the rollers are considered in succession transversely of the device, sprockets carried by each of the rods having a connecting chain, a handle on each rod, and means incorporated in one of the sprockets being movable to a locked position against the respective rod causing turning of both rods upon turning of one of the handles thereby to simultaneously adjust all of the bearings, and being movable into an unlocked position confining the adjustment to one transverse series of bearings when the appropriate handle is turned.

7. A device of the character described comprising a continuously driven spring belt, a continuously driven sizer roller situated beside the belt, a bearing for an end of the roller, means for adjusting the bearing to shift the roller in respect to the belt said means including a transverse rod, and a stud projecting from the roller adjacent to the bearing to dislodge an object settling in position between the belt, roller and rod.

JAMES B. VON CANON.